(12) United States Patent  
Kishi et al.

(10) Patent No.: US 8,022,938 B2  
(45) Date of Patent: Sep. 20, 2011

(54) CONTROL APPARATUS AND METHOD FOR INPUT SCREENS

(75) Inventors: Hiroshi Kishi, Toyota (JP); Hiroshi Yamauchi, Kariya (JP); Noritada Yoshitsugu, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 634 days.

(21) Appl. No.: 12/155,220

(22) Filed: May 30, 2008

(65) Prior Publication Data

US 2008/0278442 A1 Nov. 13, 2008

Related U.S. Application Data

(63) Continuation of application No. 09/698,441, filed on Oct. 30, 2000, now Pat. No. 7,397,463.

(30) Foreign Application Priority Data

Aug. 25, 2000 (JP) .................................. 2000-256098

(51) Int. Cl.  
*G06F 3/041* (2006.01)

(52) U.S. Cl. .................. 345/173; 178/18.01; 340/995.1; 701/24

(58) Field of Classification Search .................. 345/156, 345/173; 701/211, 24, 201, 209; 340/936, 340/461, 995, 1, 995.13, 995.16; 715/700, 715/855; 178/18.01; 296/37.12  
See application file for complete search history.

(56) References Cited

U.S. PATENT DOCUMENTS

| | | | |
|---|---|---|---|
| 5,302,948 A | 4/1994 | Lau et al. | |
| 5,550,575 A | 8/1996 | West et al. | |
| 5,694,150 A | 12/1997 | Sigona et al. | |
| 5,781,653 A | 7/1998 | Okubo | |
| 5,850,076 A | 12/1998 | Morioka et al. | |
| 6,025,869 A | 2/2000 | Stas et al. | |
| 6,163,336 A | 12/2000 | Richards | |
| 6,164,780 A | 12/2000 | Noto et al. | |
| 6,166,778 A | 12/2000 | Yamamoto et al. | |
| 6,169,955 B1* | 1/2001 | Fultz | 701/200 |
| 6,184,875 B1 | 2/2001 | Matsuura | |
| 6,239,792 B1 | 5/2001 | Yanagisawa et al. | |
| 6,263,500 B1 | 7/2001 | Yoshida et al. | |
| 6,360,167 B1* | 3/2002 | Millington et al. | 701/211 |
| 6,411,502 B1 | 6/2002 | Burrell | |
| 6,411,894 B2 | 6/2002 | Yamamoto et al. | |
| 6,593,667 B1 | 7/2003 | Onodera et al. | |
| 6,904,359 B2 | 6/2005 | Jones | |

FOREIGN PATENT DOCUMENTS

| | | |
|---|---|---|
| JP | A-08-184449 | 7/1996 |
| JP | A-10-221424 | 8/1998 |
| JP | A-10-090390 | 4/1999 |
| JP | A-11-198745 | 7/1999 |

* cited by examiner

*Primary Examiner* — Abbas Abdulselam  
(74) *Attorney, Agent, or Firm* — Oliff & Berridge, PLC

(57) ABSTRACT

A control apparatus for input screens includes a display unit, a switch portion and a control unit including a microcomputer. If one of a menu switch of the switch portion and a plurality of dummy switches included in a screen displayed by the display unit is operated, the microcomputer causes the display unit to display a new screen including a plurality of dummy switches. The microcomputer estimates a time period required for the operator to watch a screen to operate the dummy switch, depending on the displayed screen (the number of dummy switches). If the sum of estimated time periods exceeds a reference time period, the microcomputer nullifies operation of the dummy switch to prevent the screen from being switched. After the lapse of a predetermined time period, the microcomputer cancels the nullification of the operation of the dummy switch.

5 Claims, 7 Drawing Sheets

F I G. 4A
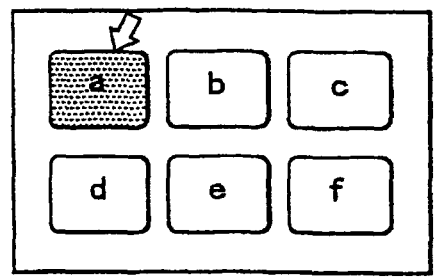
F I G. 4B
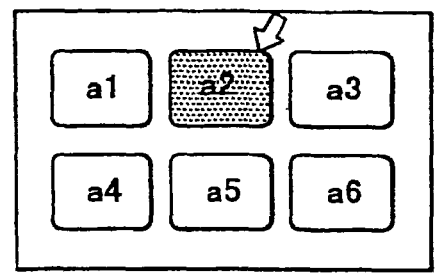
F I G. 4C
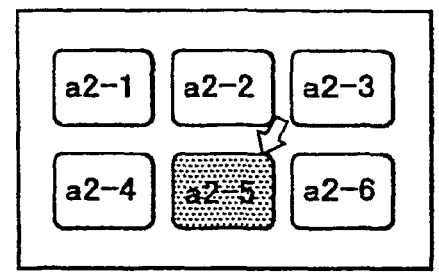
F I G. 4D
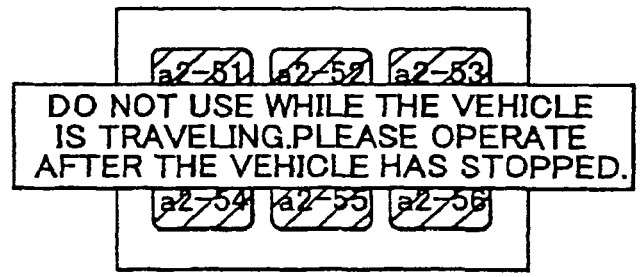

FIG. 5
| NUMBER OF DUMMY SWITCHES j | SCREEN-WATCHING ESTIMATED TIME PERIOD I |
|---|---|
| j < 3 | 1 |
| 3 ≦ j < 6 | 1.5 |
| 6 ≦ j < 9 | 2 |
| 9 ≦ j < 12 | 3 |
| 12 ≦ j | 4 |
FIG. 6A
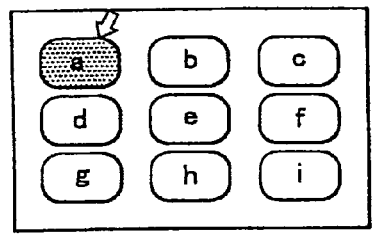
FIG. 6B
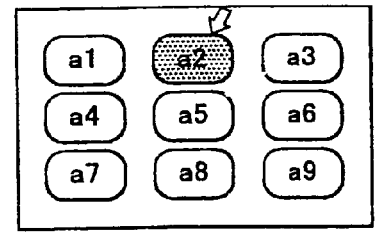
FIG. 6C
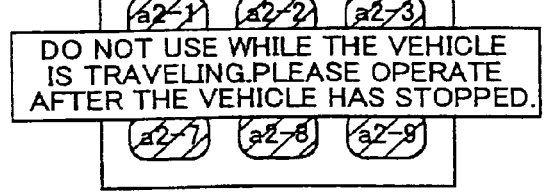

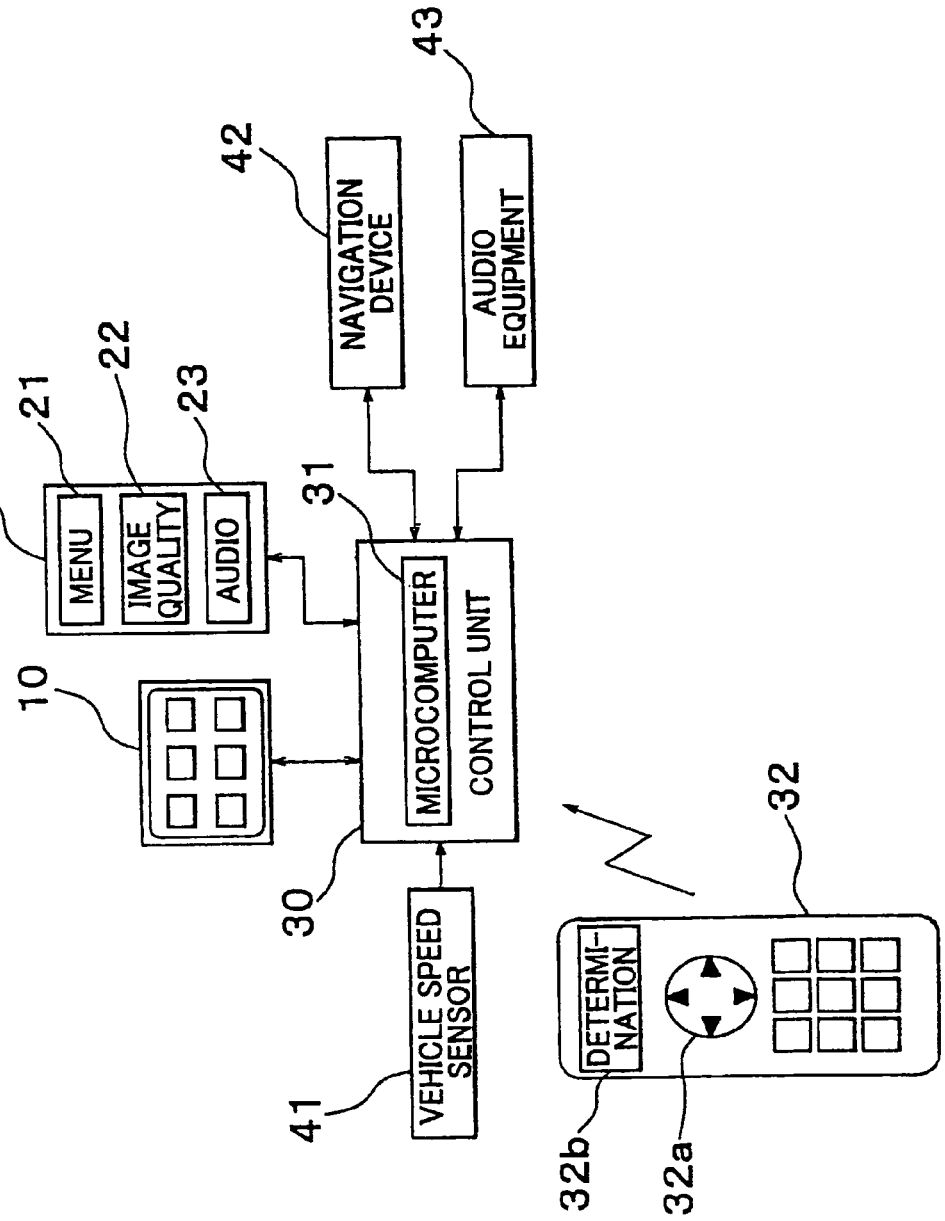

| NUMBER OF DUMMY SWITCHES j | SCREEN-WATCHING ESTIMATED TIME PERIOD I |
|---|---|
| j < 3 | 1.5 |
| 3 ≦ j < 6 | 2 |
| 6 ≦ j < 9 | 2.5 |
| 9 ≦ j < 12 | 3.5 |
| 12 ≦ j | 4.5 |

CONTROL APPARATUS AND METHOD FOR INPUT SCREENS

INCORPORATION BY REFERENCE

This is a Continuation of U.S. patent application Ser. No. 09/698,441 filed on Oct. 20, 2000, which claims the benefit of Japanese Patent Application No. 2000-256098 filed Aug. 25, 2000. The disclosures of the prior applications are hereby incorporated by reference herein in their entirety.

BACKGROUND OF THE INVENTION

1. Field of the Invention

The invention relates to a control apparatus and method for input screens that includes display means such as a display used for a navigation system installed in a vehicle or a computer exchanging information with external components.

2. Description of Related Art

As disclosed in Japanese Patent Application Laid-Open No. HEI 10-90390, this kind of apparatus has display means for displaying information including map information and current position information, operation means provided to control contents displayed by the display means and designed to be operated by a passenger, and prohibition means for prohibiting the displayed contents from being controlled by the operation means while the vehicle is traveling. The displayed contents cannot be controlled through operation of the operation means while the vehicle is traveling. Thereby restrictions are imposed on operation of the operation means by the driver.

However, according to the aforementioned art, since displayed contents cannot be controlled at all through operation of the operation means while the vehicle is traveling, the vehicle has to stop to update the displayed contents. This is inconvenient, for example, when driving along an expressway where it is difficult to stop.

SUMMARY OF THE INVENTION

In a first aspect of the invention, there is provided a control apparatus for input screens that is installed in a vehicle and constructed to input predetermined operation performed by an operator based on information displayed by display device as an operator guidance and change information to be displayed by the display device upon input of the operator guidance, comprising operation nullification device that prohibits the predetermined operation performed by the operator from being inputted as the operator guidance upon fulfillment of a predetermined condition and operation nullification canceller that cancels prohibition against the inputting of the predetermined operation performed by the operator as the operator guidance if a predetermined time period has elapsed since the prohibition against the inputting of the predetermined operation performed by the operator as the operator guidance.

According to this construction, if a predetermined condition is fulfilled, for example, if a vehicle equipped with the control apparatus has made a transition from its stopped state to its traveling state or if operator guidance has continuously been issued a predetermined times or if information has been changed based on the operator guidance (including the switching of screens), predetermined operation performed by the operator is prohibited from being inputted as operator guidance. In other words, since input operation by the operator is prohibited, displayed information is not changed even if the operator has performed predetermined operation. On the other hand, if a predetermined time period has elapsed after prohibition against the input operation, the prohibition is canceled. Therefore, the operator can continue to operate, for example, without stopping the vehicle. Also, the operator can further increase his or her attention on the driving for the predetermined time period.

In this case, the operation nullification device is preferably constructed to judge whether or not the predetermined condition has been fulfilled, depending on information displayed by the display device. For example, the information displayed on the screen includes the number of dummy switches included in the screen to be selectively operated by the operator, the size of the dummy switches and the like.

According to this construction, it is judged whether or not a predetermined condition for prohibiting input operation has been fulfilled, depending on the complexity of displayed information. Accordingly, input operation can be prohibited at a timing better suited for the driving of the vehicle.

This control apparatus preferably comprises first operation device for performing the predetermined operation based on a first action made by the operator and second operation device for performing the predetermined operation based on a second action made by the operator. The second action is different from the first action. The operation nullification device judges whether or not the predetermined condition has been fulfilled, depending on whether the predetermined operation is performed by the first operation device or by the second operation device. The first operation device includes, for example, a touch switch panel (whose display is touched for operation of dummy switches) and a switch device. The second operation device includes, for example, a remote controller equipped with a joystick.

According to this construction, it is judged whether the condition for prohibiting input operation has been fulfilled, depending on a method of issuing operator guidance (i.e. complexity of operator guidance). Therefore, input operation can be prohibited at a timing better suited for the driving of the vehicle.

In a second aspect of the invention, there is provided a control apparatus for input screens that is installed in a vehicle, comprising screen controller that causes display device to display information including a plurality of dummy switches and changing the information displayed by the display device to information corresponding to the operated dummy switch and operation nullification device that nullifies operation of the dummy switch upon fulfillment of a predetermined condition and prohibiting information displayed by the display device from being changed based on the operation. In this control apparatus, the operation nullification device is constructed to judge whether or not the predetermined condition has been fulfilled, depending on the number of dummy switches included in information displayed by the display device.

According to this construction, information including a plurality of dummy switches is displayed by the display device. If the operator selectively operates one of the dummy switches, the displayed information is updated. This newly displayed information also includes a plurality of dummy switches and is changed into other information through selective operation by the operator. In this manner, the displayed information is sequentially changed so that a dummy switch desired by the operator is eventually operated. On the other hand, if a predetermined condition is fulfilled, operation of a dummy switch is nullified and information displayed by the display device is not changed. It is judged whether the predetermined condition has been fulfilled, depending at least on the number of dummy switches included in the displayed information. Accordingly, for example, if it is estimated that a great number of dummy switches are included in the displayed information and that a long time period is required to select one of the dummy switches, operation of the dummy switch can be nullified at an early stage and the nullification can be carried out at a suitable timing.

In this case, the control apparatus preferably comprises operation nullification canceller that cancels nullification of operation of the dummy switch if a predetermined time period has elapsed since the start of nullification of the operation by the operation nullification device.

According to this construction, nullification of operation is canceled if a predetermined time period has elapsed since the nullification. Therefore, the operator can continue to operate, for example, without stopping the vehicle. Also, the operator can further increase his or her attention on the driving for the predetermined time period.

Also, the control apparatus preferably comprises operation nullification canceller that cancels nullification of the operation of the dummy switch by the operation nullification device if the vehicle has stopped.

According to this construction, it is possible to operate input screens while the vehicle is stopped.

In a third aspect of the invention, there is provided a control apparatus for input screens that is installed in a vehicle and constructed to cause display device to display information including a plurality of dummy switches and cause the display device to display new information corresponding to one of the dummy switches that has selectively been operated, comprising summation time period calculator that estimates a time period required for an operator to watch the displayed information to selectively operate one of the dummy switches included in the displayed information during a period from the start to the stop of the vehicle, estimates a time period required for the operator to watch newly displayed information to selectively operate one of a plurality of dummy switches included in the newly displayed information, and calculates a sum of the estimated time periods, and operation nullification device that nullifies operation performed by the operator for selection of one of a plurality of dummy switches included in the newly displayed information if the summation time period is longer than a reference time period, and prohibits new information corresponding to the operated dummy switch from being displayed by the display device.

According to this construction, during a period from the start to the stop of the vehicle, a time period required for the operator to watch the displayed information to selectively operate one of a plurality of dummy switches included in the displayed information and a time period required for the operator to watch newly displayed information to selectively operate one of a plurality of dummy switches included in the newly displayed information are estimated. Then a sum of the estimated time periods is calculated. If the summation time period is longer than a reference time period, the selective operation of the dummy switch included in the newly displayed information is nullified. Accordingly, if it is estimated that a great number of dummy switches are included in the displayed information and that a long time period is required to select one of the dummy switches, operation of the dummy switch can be nullified at an early stage and the nullification can be carried out at a suitable timing.

In the control apparatus for input screens having the aforementioned features, it is preferable to provide operation nullification canceller that cancels nullification of operation of the dummy switch if a predetermined time period has elapsed since the start of nullification of the operation by the operation nullification device.

According to this construction, if a predetermined time period has elapsed since nullification of operation, the nullification is canceled. Therefore, the operator can continue to operate, for example, without stopping the vehicle. Also, the operator can further increase his or her attention on the driving for the predetermined time period.

In the control apparatus for input screens having the aforementioned features, it is preferable to cancel nullification of operation of the dummy switch by the operation nullification device if the vehicle has stopped.

According to this construction, it is possible to operate input screens while the vehicle is stopped.

In the control apparatus for input screens having the aforementioned features, the summation time period calculator is preferably constructed to calculate the summation time period for information that is displayed after cancel of nullification of the operation.

According to this construction, nullification of operation is prevented from being carried out too frequently. Therefore, input screens can be operated smoothly.

In the control apparatus for input screens having the aforementioned features, the summation time period calculator is preferably constructed to estimate a time period required to watch the displayed information, depending on the number of the dummy switches included in the information.

This is because the time period required to watch the screen increases with increases in the number of dummy switches included in displayed information.

In the control apparatus for input screens having the aforementioned features, it is preferable to employ the following construction. That is, the control apparatus further comprises first operation device for performing operation of the dummy switch based on a first action made by the operator and second operation device for performing operation of the dummy switch based on a second action made by the operator. The second action is different from the first action. The summation time period calculator is preferably constructed to estimate a time period required to watch the information, depending on whether the operation of the dummy switch is performed by the first operation device or by the second operation device.

This is because the time period required to watch the screen increases with increases in complexity of selective operation of dummy switches.

BRIEF DESCRIPTION OF THE DRAWINGS

FIGS. 4A through 4D show in a time series manner screens displayed on the display device shown in FIG. 1 by the microcomputer shown in FIG. 1;

FIG. 5 is a table to which the microcomputer shown in FIG. 1 refers when calculating a screen-watching estimated time period;

FIGS. 6A through 6C show in a time series manner screens displayed on the display device shown in FIG. 1 by the microcomputer shown in FIG. 1;

FIG. 7 is a general view of a control apparatus for input screens according to a second embodiment of the invention;

DETAILED DESCRIPTION OF PREFERRED EMBODIMENTS

Figure 1:
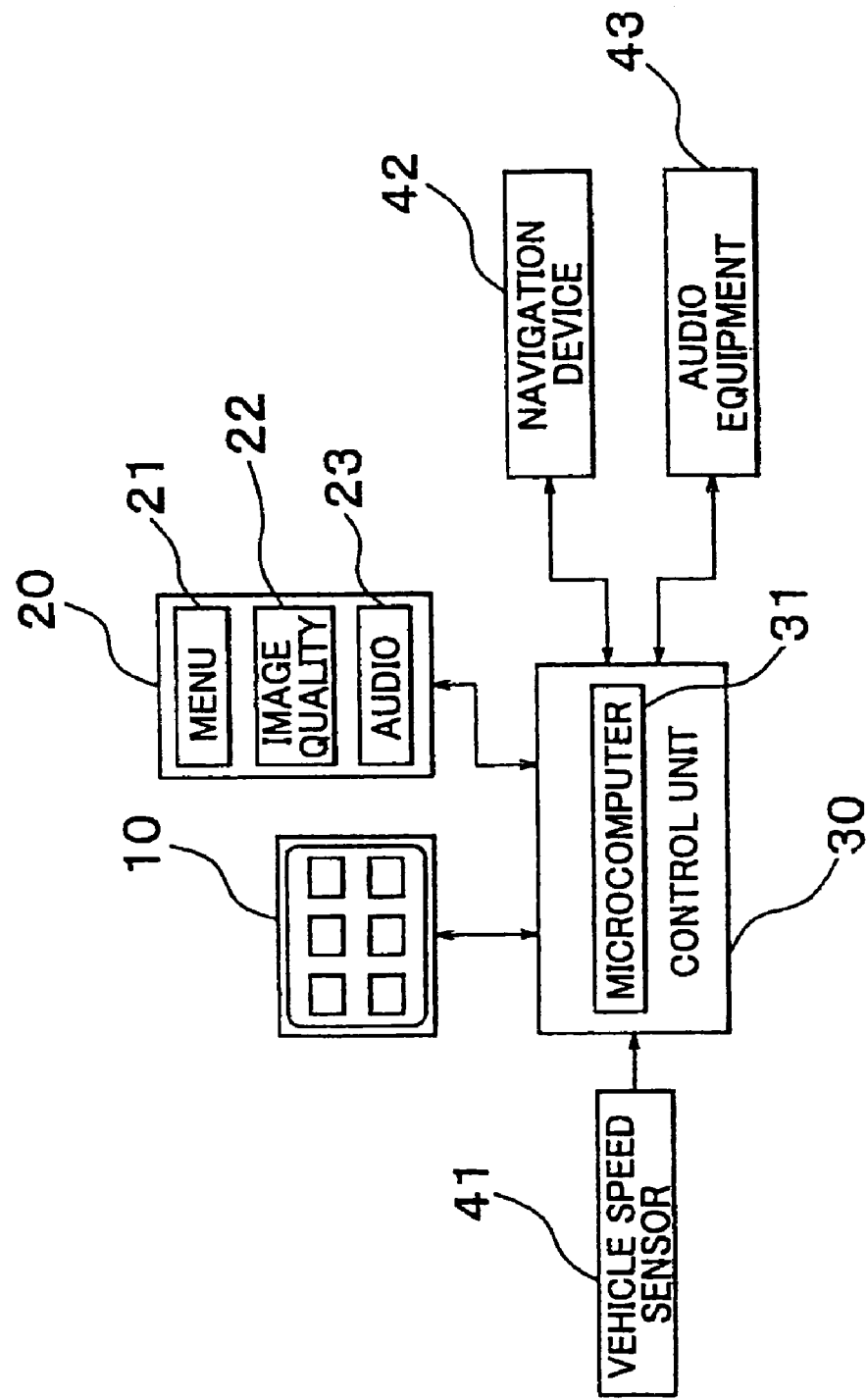
FIG. 1 is a general view of a control apparatus for input screens according to a first embodiment of the invention.

Hereinafter, embodiments of a control apparatus for input screens (a screen display device) of the invention will be described with reference to the drawings. A control apparatus for input screens according to a first embodiment of the invention as generally shown in FIG. 1 is composed of a display unit 10 designed as display device, a switch portion 20, and a control unit 30 to which the display unit 10 and the switch portion 20 are connected.

The display unit 10 includes a liquid-crystal color display functioning also as a so-called touch switch panel and displays geographical information and information (a screen) including a plurality of dummy switches (list change-over switches) in accordance with a signal from the control unit 30. In a state where information (a screen) including a plurality of dummy switches is displayed, if one of the dummy switches is selectively operated (touched) by the operator, the display unit 10 sends out to the control unit 30 a signal designative of the operated dummy switch (a signal designative of a position on the screen that has been touched).

The switch portion 20 has a plurality of push-button switches such as a menu switch 21, an image quality adjustment guidance switch 22, an audio-operation selecting switch 23 and the like, and sends out to the control unit 30 a signal designative of the operated switch.

The control unit 30 is constructed to include a microcomputer 31, and is connected to a vehicle speed sensor 41 for detecting a speed (a vehicle speed) of a vehicle in which the control apparatus for input screens is installed, a navigation device 42 mainly for displaying a position of the vehicle on a map, and an audio equipment 43 for the vehicle, as well as the display unit 10 and the switch portion 20. The control unit 30 receives necessary information from these components and sends out necessary signals to them. In combination with the display unit 10, the switch portion 20 and the navigation device 42, the control unit 30 constitutes a navigation system.

To be more specific, the microcomputer 31 of the control unit 30 sends out information on a screen to be displayed on the display unit 10 and controls (changes and updates) the information (the displayed screen) displayed by the display unit 10. In a state where information including a plurality of dummy switches is displayed by the display unit 10, if a signal designative of a dummy switch to be selectively operated by the display unit 10 is inputted, the microcomputer 31 operates in a manner corresponding to the designated (i.e. selectively operated) dummy switch. This operation includes displaying new information (which may include a plurality of dummy switches) on the display unit 10, causing the navigation device 42 to recognize a destination and calculate a required time period and the like, and sending out to the audio equipment 43 a guidance signal for changing volume and tone.

Figure 2:
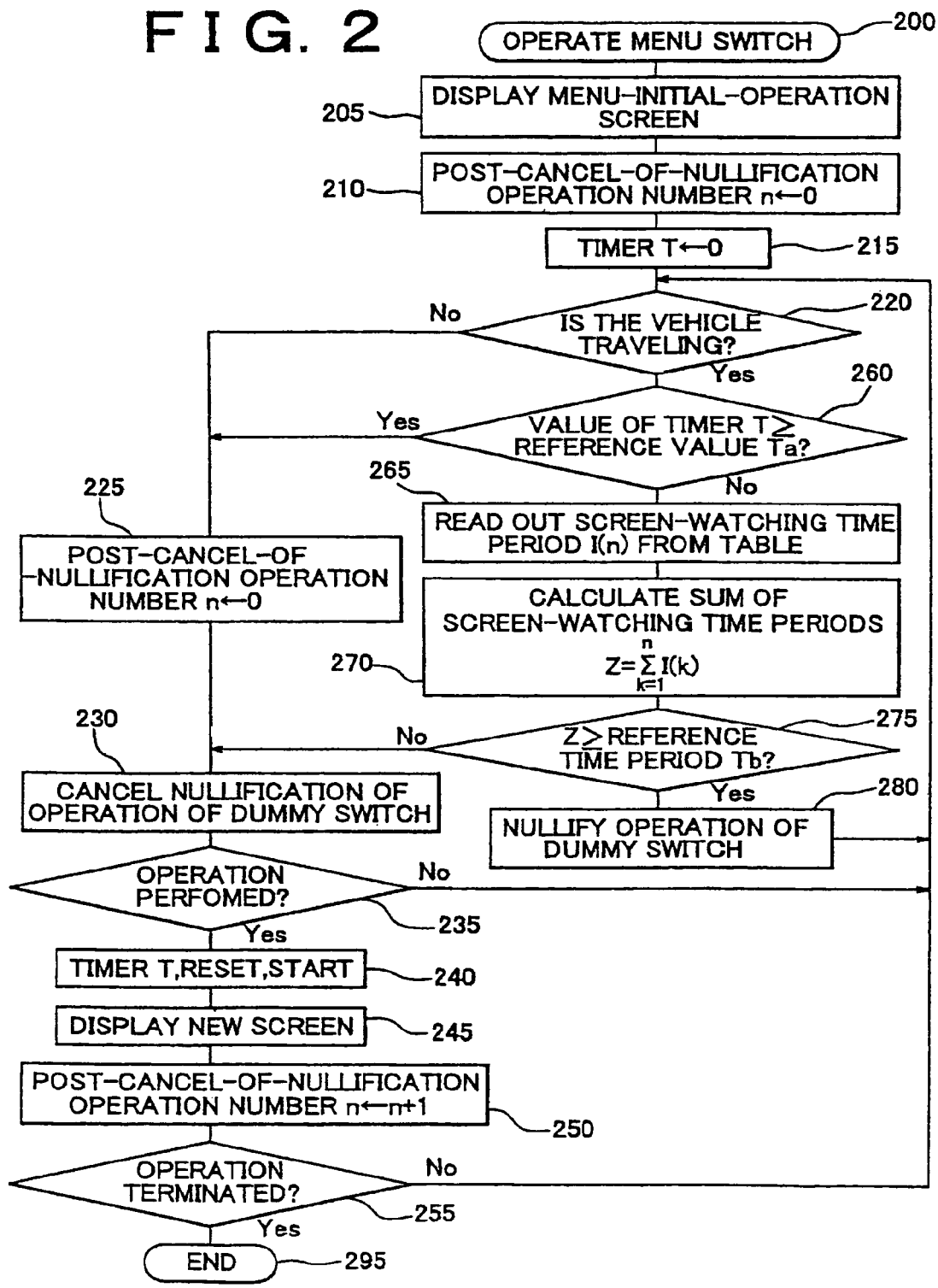
FIG. 2 is a flowchart showing a routine executed by a microcomputer shown in FIG. 1.

Next, operation of the control apparatus for input screens will be described with reference to FIGS. 2 through 6. FIG. 2 shows a flowchart of a routine (a program) executed by the microcomputer 31 of the control unit 30 when the operator operates the menu switch 21 of the switch portion 20. FIGS. 3, 4 and 6 conceptually show information (a screen) displayed by the display unit 10 when the microcomputer 31 executes the routine shown in FIG. 2. FIG. 5 is a table of preliminarily experimentally gathered data of a time period (a screen-watching estimated time period I) required for the operator to watch displayed information (a screen) until he or she selectively operates (touches) two of a plurality of dummy switches included in the information (the screen) with a finger, in connection with the number of dummy switches included in the information (the screen). This table is stored in a memory (not shown) in the control unit 30 and referred to by the microcomputer 31 when executing the routine shown in FIG. 2.

(1) First of all, the description will be made as to a case where the menu switch 21 of the switch portion 20 is operated when the vehicle is stopped. The microcomputer 31 starts processings of the routine shown in FIG. 2 from STEP 200 and then proceeds to STEP 205. In STEP 205, the microcomputer 31 displays a menu-initial-operation screen shown in FIG. 3A on the display unit 10. In this example, the menu-initial-operation screen includes six dummy switches.

Next, the microcomputer 31 proceeds to STEP 210 to set a post-cancel-of-nullification operation number n to "1", and proceeds to STEP 215 to set the value of a timer T to "0". The post-cancel-of-nullification operation number n is a variable indicative of the number of operations of a dummy switch after nullification of operation of the dummy switch (restriction on the operation of the dummy switch) has been cancelled. Nullification of operation means that operation of the dummy switch is not accepted and that no action corresponding to the operation is made (i.e. that input operation is prohibited). Next, the microcomputer 31 proceeds to STEP 220 to judge based on a signal from the vehicle speed sensor 41 whether or not the vehicle is traveling. Now that the vehicle is stopped, the microcomputer 31 makes a negative judgment in STEP 220 and proceeds to STEP 225 to reset the post-cancel-of-nullification operation number n to "0".

Then the microcomputer 31 proceeds to STEP 230 to cancel nullification of operation of a dummy switch in the displayed screen. If the dummy switch is operated, the microcomputer 31 regards the operation as valid and realizes a state where an action corresponding to the operation can be made. As will later be described, if operation of a dummy switch in the displayed screen has been nullified, the dummy switch is displayed with its tone lowered (in a dark state). Thus, the tone of the dummy switch is restored to its normal tone through execution of STEP 230. At the present stage, since the operation of the dummy switch has not been nullified, execution of STEP 230 does not cause any changes.

Next, the microcomputer 31 proceeds to STEP 235 to judge based on a signal from the display unit 10 whether or not one of the dummy switches has been operated (touched by a finger of the operator). At this moment, if no dummy switch has been operated, the microcomputer 31 makes a negative judgment in STEP 235 and returns to STEP 220. As a result, as long as the vehicle is stopped, STEPS 220 through 235 are repeatedly executed. It is monitored in STEP 235 whether or not one of the dummy switches has been operated.

Figure 3A:
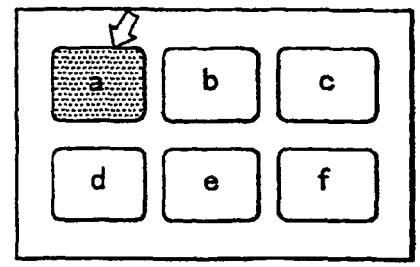
FIGS. 3A through 3E show in a time series manner screens displayed on a display device shown in FIG. 1 by the microcomputer shown in FIG. 1.
Figure 3B:
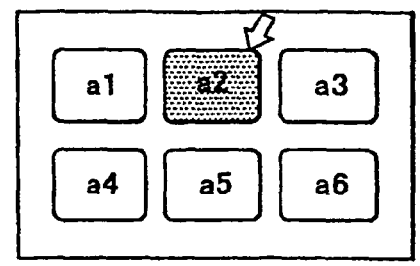

If the operator selectively operates one of a plurality of dummy switches shown in FIG. 3A, the microcomputer 31 makes a positive judgment in STEP 235, proceeds to STEP 240 to reset the value of the timer T and start clocking operation by means of the timer T, and proceeds to STEP 245 to display a new screen corresponding to the selected dummy switch. In the example of FIG. 3, a dummy switch a is selectively operated based on the screen shown in FIG. 3A, and a new screen including a plurality of (six) dummy switches shown in FIG. 3B is displayed. That is, STEPS 235, 245 constitute screen control means for inputting as an operator guidance a predetermined action by the operator, namely, an action of selectively operating one of a plurality of dummy switches (information) displayed by the display unit 10, and for changing (switching) information (screens) displayed by the display unit 10 in accordance with the inputted operation.

Figure 3C:
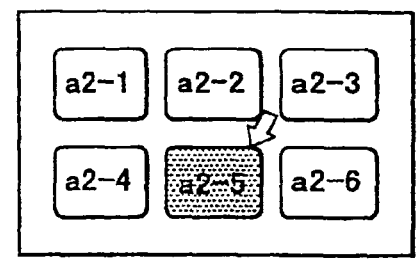

Next, the microcomputer 31 proceeds to STEP 250 to increase the post-cancel-of-nullification operation number n by "1", and proceeds to STEP 255 to judge whether or not the operation of the dummy switch has been terminated. Termination of operation of a dummy switch means that a final action to be made is determined by the operated dummy switch and that further operations of dummy switches are not required. In the example of FIG. 3, operation of dummy switches is performed four times, and expressways in a specific region shown in FIG. 3E are displayed as a final action. Thus, at this stage, the operation has not been terminated. Accordingly, the microcomputer 31 makes a negative judgment in STEP 255 and returns to STEP 220.

Hereinafter, as long as the vehicle is stopped, the microcomputer 31 repeatedly executes STEPS 220 through 235. Every time one of newly displayed dummy switches is selectively operated, the microcomputer 31 executes STEPS 240 through 255. As a result, the screen displayed by the display unit 10 is sequentially switched to a screen corresponding to a dummy switch that has been selectively operated. In the example of FIG. 3, dummy switches a2, a2-5 are selected from screens shown in FIGS. 3B, 3C, whereby screens shown in FIGS. 3C, 3D are displayed respectively.

Figure 3D:
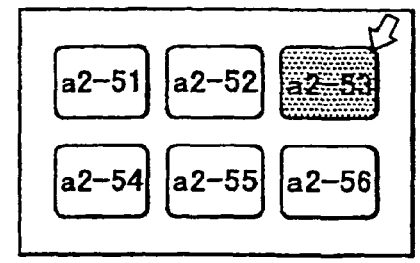
Figure 3E:
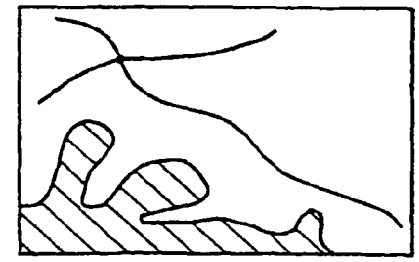

If, for example, a dummy switch a2-53 is selected from a plurality of dummy switches included in the screen shown in FIG. 3D, a final screen shown in FIG. 3E is displayed so that further selective operations of dummy switches become unnecessary. Accordingly, the microcomputer 31 makes a positive judgment in STEP 255 and proceeds to STEP 295 to terminate the present routine. In this manner, if the vehicle is stopped (if the vehicle is not traveling), operations of dummy switches are not nullified.

(2) The following description will be made with reference to FIG. 4 as to a case where the vehicle is traveling. For convenience of explanation, it is assumed herein that dummy switches to be operated for selection from displayed screens are identical to those which have been described with reference to FIG. 3. Accordingly, FIGS. 4A through 4D correspond to FIGS. 3A through 3D respectively. It is assumed herein that a required time period from operation of one dummy switch to operation of the next dummy switch is approximately equal to a time period required for normal operation.

Also in this case, if the operator operates the menu switch 21, the microcomputer 31 starts the processings of the routine shown in FIG. 2 from STEP 200 and proceeds to STEP 205 to display a menu-initial-operation screen shown in FIG. 4A on the display unit 10. Then the microcomputer 31 proceeds to STEP 210 to set the post-cancel-of-nullification operation number n to "1", proceeds to STEP 215 to set the value of the timer T to "0", and proceeds to STEP 220 to judge whether or not the vehicle is traveling. In this case, since the vehicle is traveling, the microcomputer 31 makes a positive judgment in STEP 220 and proceeds to STEP 260 to judge whether or not the timer T indicates a value greater than a reference value (a reference time period) Ta.

Because the value of the timer T is set to "0" in STEP 215, it is smaller than the reference value Ta. Accordingly, the microcomputer 31 makes a negative judgment in STEP 260 and proceeds to STEP 265. In STEP 265, the microcomputer 31 refers to the table shown in FIG. 5, reads out a screen-watching estimated time period I (=2 (seconds)) corresponding to the number of dummy switches j (=6) included in a currently displayed screen (in this case, the menu-initial-operation screen shown in FIG. 4A), and stores it as a screen-watching estimated time period I(n)=I(1) corresponding to the post-cancel-of-nullification operation number n.

Next, the microcomputer 31 proceeds to STEP 270 and calculates a sum Z of screen-watching estimated time periods (a summation time period) according to an equation shown in STEP 270. At this stage, since n has been set to "1" in STEP 215, the summation time period Z is equal to I(1)=2 (seconds). Next, the microcomputer 31 proceeds to STEP 275 to judge whether or not the calculated summation time period Z is longer than a reference time period Tb (e.g. 6 (seconds)).

In this case, since the summation time period Z (=2 (seconds)) is shorter than the reference time period Tb (=6 (seconds)), the microcomputer 31 makes a negative judgment in STEP 275 and proceeds to STEP 230 to cancel nullification of operation of a dummy switch in the displayed screen. At this stage, since operation of the dummy switch has not been nullified, execution of STEP 230 does not cause any changes.

Next, the microcomputer 31 proceeds to STEP 235 to judge whether or not operation of a dummy switch has been performed. If no such operation has been performed, the microcomputer 31 makes a negative judgment in STEP 235 and returns to STEP 220. Thereafter, while the vehicle is traveling, STEPS 220, 260 through 275, 230 and 235 are repeatedly executed. It is monitored in STEP 235 whether or not operation of a dummy switch has been performed.

If the operator selectively operates one of a plurality of dummy switches shown in FIG. 4A, the microcomputer 31 makes a positive judgment in STEP 235, proceeds to STEP 240 to reset the value of the timer T and start clocking operation by means of the timer T, and then proceeds to STEP 245 to display a new screen corresponding to the selected dummy switch. In the example of FIG. 4, the dummy switch a is selectively operated based on the screen shown in FIG. 4A, and a screen shown in FIG. 4B is displayed.

Next, the microcomputer 31 proceeds to STEP 250 to increase the post-cancel-of-nullification operation number n by "1" to "2", and proceeds to STEP 255 to judge whether or not the operation of the dummy switch has been terminated. At this stage, since the operation of the dummy switch has not been terminated, the microcomputer 31 makes a negative judgment in STEP 255 and returns to STEP 220.

At this moment, since the vehicle is traveling, the microcomputer 31 makes a positive judgment in STEP 220 and proceeds to STEP 260. Because the value of the timer T has just been reset in STEP 240, it indicates a time period shorter than the reference time period Ta. Accordingly, the microcomputer 31 makes a negative judgment in STEP 260, and proceeds to STEP 265 to read out a screen-watching estimated time period I=2 (seconds) corresponding to the number j=6 of dummy switches included in the currently displayed screen (i.e. the screen shown in FIG. 4B) and store it as a screen-watching estimated time period I(n)=I(2) corresponding to the post-cancel-of-nullification operation number (=2).

Thus, a sum Z of screen-watching estimated time periods (a summation time period) can be calculated as Z=I(1)+I(2) =2+2=4 (seconds). However, since this summation time period is shorter than the reference time period Tb (=6 (seconds)), the microcomputer 31 makes a negative judgment in STEP 275 and proceeds to STEP 230 to cancel nullification of the operation of the dummy switch. Also in this case, since the operation of the dummy switch has not been nullified, execution of STEP 230 does not cause any changes. Next, the microcomputer 31 proceeds to STEP 235 to judge whether or not operation of a dummy switch has been performed. If no such operation has been performed, the microcomputer 31 returns to STEP 220. Thereafter, as long as the vehicle is traveling, STEPS 220, 260 through 275, 230 and 235 are repeatedly executed. It is monitored in STEP 235 whether or not operation of a dummy switch has been performed.

Meanwhile, the value of the timer T gradually increases. However, the next dummy switch is operated before the value of the timer T reaches the reference time period Ta. Therefore, the microcomputer 31 makes a positive judgment in STEP 235 before making a positive judgment in STEP 260. As a result, the microcomputer 31 proceeds to STEP 240 to again reset the value of the timer T and start clocking operation, and proceeds to STEP 245 to display a new screen. In the example of FIG. 4, the dummy switch a2 is operated for selection from a plurality of dummy switches included in the screen shown in FIG. 4B, and the screen shown in FIG. 4C is displayed.

Next, the microcomputer 31 proceeds to STEP 250 to increase the post-cancel-of-nullification operation number n by "1" to "3". Because operation of a finally required dummy switch has not been terminated yet, the microcomputer 31 makes a negative judgment in STEP 255 and returns to STEP 220. Also in this case, the vehicle is traveling, and the timer T indicates a small value. Therefore, the microcomputer 31 makes a positive judgment in STEP 220, makes a negative judgment in STEP 260, and proceeds to STEP 265 to read out a screen-watching estimated time period I(n)=I(3) from the table.

At this moment, in the example of FIG. 4, since a screen including the six dummy switches shown in FIG. 4C is displayed, the screen-watching estimated time period I(3) is equal to 2 (seconds). Accordingly, the summation time period Z calculated in STEP 270 is equal to I(1)+I(2)+I(3)=6 (seconds). Thus, the microcomputer 31 makes a negative judgment in STEP 275 and proceeds to STEP 230 and the following STEPS. Accordingly, selective operation of the dummy switch is not nullified.

Thereafter, as in the aforementioned case, it is monitored in STEP 235 whether or not operation of a dummy switch has been performed. Accordingly, if one of the dummy switches shown in FIG. 4C (e.g. the dummy switch a2-5) is selected, the microcomputer 31 makes a positive judgment in STEP 235, proceeds to STEP 240 to again reset the value of the timer T to "0" and start clocking operation, and proceeds to STEP 245 to display a new screen corresponding to the dummy switch a2-5 (the same screen as shown in FIG. 3D). As will later be described, this screen is displayed instantaneously.

Next, the microcomputer 31 increases the post-cancel-of-nullification operation number n by "1" to "4". Because operation of a finally required dummy switch has not been terminated yet, the microcomputer 31 makes a negative judgment in STEP 255 and returns to STEP 220. Also in this case, the vehicle is traveling, and the timer T indicates a small value. Therefore, the microcomputer 31 makes a positive judgment in STEP 220, makes a negative judgment in STEP 260, and proceeds to STEP 265 to read out a screen-watching estimated time period I(n)=I(4) from the table.

In this case, since a screen including the six dummy switches shown in FIG. 3D is displayed, the screen-watching estimated time period I(4) is equal to 2 (seconds). Accordingly, the summation time period Z calculated in STEP 270 is equal to I(1)+I(2)+I(3)+I(4)=8 (seconds). This is longer than the reference time period Tb=6 (seconds).

As a result, the microcomputer 31 makes a positive judgment in STEP 275 and proceeds to STEP 280 to perform a processing of nullifying operation of a dummy switch in the displayed screen (a processing of prohibiting predetermined operation by the operator from being inputted as an operator guidance). To be more specific, even in the case where one of the dummy switches in this screen has selectively been operated, all the operations thereof (including the changing of displayed information and the switching of screens) are prohibited, and the tone of the dummy switches in the displayed screens is lowered. Also, as shown in FIG. 4D, a notice "Do not use while the vehicle is traveling. Please operate after the vehicle has stopped." is displayed at the center of the screen for a predetermined time period (e.g. 5 seconds).

Hereinafter, as long as the vehicle is traveling, the microcomputer 31 repeatedly executes STEPS 220 and 260 through 280, and nullification of the operation of the dummy switch is continued. On the other hand, the value of the timer T gradually increases during this period. Accordingly, the value of the timer T indicates a time period longer than the reference time period Ta after the lapse of a predetermined time period. Thus, the microcomputer 31 makes a positive judgment in STEP 260, proceeds to STEP 225 to set the post-cancel-of-nullification operation number n to "0", and proceeds to STEP 230 to cancel nullification of the operation of the dummy switch.

Hereinafter, the microcomputer 31 repeatedly executes STEPS 235, 220, 260, 225 and 230. It is monitored in STEP 235 whether or not operation of a dummy switch has been performed. As a result, if one of a plurality of dummy switches shown in FIG. 3D (e.g. a2-53) is operated, the microcomputer 31 makes a positive judgment in STEP 235, proceeds to STEP 240 to again reset the value of the timer T to "0" and start clocking operation, and proceeds to STEP 245 to display a new screen (information shown in FIG. 3E) corresponding to the dummy switch a2-53. The microcomputer 31 increases the post-cancel-of-nullification operation number n by "1" in STEP 250, and proceeds to STEP 255 to judge whether or not the operation of the dummy switch has been terminated. In this case, the screen shown in FIG. 3E is a final one, and additional selective operation of dummy switches is unnecessary. Accordingly, the microcomputer 31 makes a positive judgment in STEP 255, and proceeds to STEP 295 to terminate the present routine. Thus, while the vehicle is traveling, if the sum Z of screen-watching estimated time periods I(n) exceeds the reference time period Tb, input operation is nullified. If the reference time period Ta has elapsed since then, nullification of the input operation is canceled.

(3) The following description will be made as to a case where the vehicle makes a transition from its traveling state to its stopped state in a situation where operation of a dummy switch has been nullified through execution of STEP 280. In the situation where the operation of the dummy switch has been nullified, the microcomputer 31 repeatedly executes STEPS 220 and 260 through 280. Accordingly, if the vehicle makes a transition from its traveling state to its stopped state, the microcomputer 31 makes a negative judgment in STEP 220, and proceeds to STEPS 225, 230 to set the post-cancel-of-nullification operation number n to "0" and cancel nullification of the operation of the dummy switch, as in the case where the value of the timer T has become greater than the reference value Ta.

(4) The following description will be made as to a case where the value of the timer T exceeds the reference time period Ta in a situation where the vehicle is traveling and where operation of a dummy switch in the currently displayed screen has not been nullified. The dummy switch a2 is operated for selection from the screen shown in FIG. 4B, and the screen shown in FIG. 4C is thereby displayed. The following description will be made as to an example where a sufficiently long time period elapses before the dummy switch a2-5 is operated for selection from the screen shown in FIG. 4C.

If the dummy switch a2 is operated for selection from the screen shown in FIG. 4B, the microcomputer 31 proceeds to STEP 240 to reset the value of the timer T and start clocking operation, and proceeds to STEP 245 to display the screen shown in FIG. 4C. After having passed through STEPS 250, 255, the microcomputer 31 repeatedly executes STEPS 220, 260 through 275, 230 and 235. It is monitored in STEP 235 whether or not operation of a dummy switch has been performed.

In this case, it takes a sufficiently long time from display of the screen shown in FIG. 4C to selective operation of the dummy switch a2-5. Therefore, the value of the timer T continues to increase and becomes longer than the reference time period Ta. Accordingly, the microcomputer 31 makes a positive judgment in STEP 260, proceeds to STEP 225 to set the post-cancel-of-nullification operation number n to "0", and proceeds to STEP 230 to cancel nullification of operation of a dummy switch. However, at this stage, since the operation of the dummy switch has not been nullified, execution of STEP 230 does not cause any changes. Thereafter, the microcomputer 31 repeatedly executes STEPS 235, 220, 260, 225 and 230. It is monitored in STEP 235 whether or not operation of a dummy switch has been performed.

If the dummy switch a2-5 is thereby selectively operated, the microcomputer 31 makes a positive judgment in STEP 235, executes STEPS 240 through 255, and returns to STEP 220. At this moment, through execution of STEP 250, the post-cancel-of-nullification operation number n that has been set to "0" in STEP 225 becomes equal to "1". Consequently in STEP 265, which follows STEPS 220, 260, a screen-watching estimated time period I=2 (seconds) corresponding to the number j=6 of dummy switches included in the screen shown in FIG. 4C is read out. This is stored as a screen-watching estimated time period I(n)=I(1). Accordingly, the summation screen-watching time period Z calculated in STEP 270 is equal to I(1)=2 (seconds). Thus, the microcomputer 31 makes a negative judgment in STEP 275, and proceeds to STEP 230 and the following STEPS instead of proceeding to STEP 280. Therefore, the input operation is not nullified.

If the dummy switch a2-5 is selected from the screen shown in FIG. 4C, the post-cancel-of-nullification operation number n becomes equal to "2" through execution of STEP 250. Thus, the screen-watching estimated time period I(2) calculated in later-executed STEP 260 is equal to 2 (seconds). The screen-watching estimated time period Z calculated in STEP 270 is equal to I(1)+I(2)=2+2=4 (seconds). Thus, since the summation time period Z (=4 (seconds)) is shorter than the reference time period Tb (=6 (seconds)), the microcomputer 31 makes a negative judgment in STEP 275 and proceeds to STEP 230 and the following STEPS instead of proceeding to STEP 280. Therefore, the operation of the dummy switch based on the screen shown in FIG. 4D (FIG. 3D) is not nullified.

(5) The following description will be made briefly with reference to FIG. 6 as to a case where a great number of dummy switches are included in one screen. In this case, the basic operation is the same as in the aforementioned cases (1) through (4). However, since nine dummy switches are included in each screen, the screen-watching estimated time period I calculated in STEP 265 is equal to 3 (seconds). Thus, in a situation where, for example, the dummy switch a has been selected from the screen shown in FIG. 6A and where the vehicle has thereafter stopped or the value of the timer T does not exceed the reference value Ta, if, for example, the dummy switch a2 is selected from the screen shown in FIG. 6B, the summation screen-watching estimated time period Z is equal to I(1)+I(2)+I(3)=9 (seconds). This is longer than the reference time period Tb (=6 (seconds)). As a result, while operation of a dummy switch based on the fourth screen (the screen shown in FIG. 4D) is nullified in the example shown in FIG. 4, operation of a dummy switch based on the third screen (the screen shown in FIG. 6C) is nullified in the example shown in FIG. 6.

As described above, the microcomputer 31 displays new information (a screen) every time a dummy switch is selectively operated. In accordance with the number of dummy switches included in each of the displayed screens, the microcomputer 31 estimates a time period required for the operator (the driver) to selectively operate one dummy switch from a plurality of dummy switches included in the already displayed screen and a time period required for the operator to selectively operate one dummy switch from a plurality of dummy switches included in a new screen to be displayed and operate it, by reading them out from the table shown in FIG. 5. If the sum Z of these estimated time periods exceeds the reference time period Tb, the microcomputer 31 judges that the timing has to come to urge the operator to pay further attention to the driving, and then nullifies selective operation of the dummy switch.

Furthermore, if the vehicle has stopped in a state where selective operation of a dummy switch is nullified, the microcomputer 31 judges that the operator (the driver) may pay attention to selective operation of a dummy switch, and cancels nullification of selective operation of the dummy switch. In a state where selective operation of a dummy switch has been nullified, if a sufficient time period (a time period corresponding to the reference value Ta) has elapsed since last operation of a dummy switch, the microcomputer 31 judges that the driver has increased his or her attention to the driving, and cancels nullification of selective operation of the dummy switch. In addition, if nullification of input operation has been canceled, it is necessary to prevent a decrease in operability from being caused by excessive nullification of dummy switches. For this purpose, a sum Z of the screen-watching estimated time periods I since cancel of the nullification is calculated, and a judgment is made based on the summation time period Z as to the necessity for nullification.

The aforementioned first embodiment can also be interpreted as a method of switching display of screens for image display devices. That is, the method of switching screens according to the first embodiment is constructed as follows. In an image display device, if a dummy switch designed as a switch for change-over of lists extending over some screens has been operated (i.e. if the summation time period Z has become longer than a time period corresponding to the reference value Tb), while the vehicle is traveling, list screens (screens including a plurality of dummy switches) are prevented from being switched for a predetermined time period (a time period corresponding to the reference value Ta, for example, 10 to 30 seconds), no matter how many times the switch for change-over of the lists is operated. If the switch for change-over of the lists has been operated after the lapse of the predetermined time period, the list screens are switched. This ensures that the driver spends a certain amount of time looking ahead instead of focusing attention on the screens. Even if the screens have been scrolled while the vehicle is traveling, the driver can feel relaxed.

Next, a control apparatus for input screens according to a second embodiment of the invention will be described. As shown in FIG. 7, this control apparatus is structurally different from that of the first embodiment shown in FIG. 1 only in that it is provided with a remote control device 32. This remote control device 32 is intended to selectively operate one of a plurality of dummy switches displayed by the display unit 10. The remote control device 32 has a joystick 32a and a determining button 32b, and is constructed to allow communication with the microcomputer 31 of the control unit 30. The joystick 32a can be switched in top-and-bottom directions and left-and-right directions.

A method of selectively operating a dummy switch by means of the joystick 32a will now be described. First of all, a specific one of a plurality of dummy switches included in the screen of the display unit 10 is displayed in such a manner that it can be distinguished from the other dummy switches. This will hereinafter be referred to as a marking. If the determining button is pressed in this state, a dummy switch that has been marked is operated. If the operator presses one of top, bottom, left and right portions of the joystick 32a before pressing the determining button 32b, the marking moves to an adjacent switch located in a direction corresponding to the direction in which the joystick 32a is pressed. If the joystick 32a is operated in this manner and if the determining button 32b is pressed as soon as a desired dummy switch is marked, the dummy switch is operated. Accordingly, in the case where a dummy switch is selectively operated by means of the joystick 32a, more time is required in comparison with the case where the operator selectively operates a dummy switch by touching a screen of the display unit 10 with a finger.

Figures 8, 9:
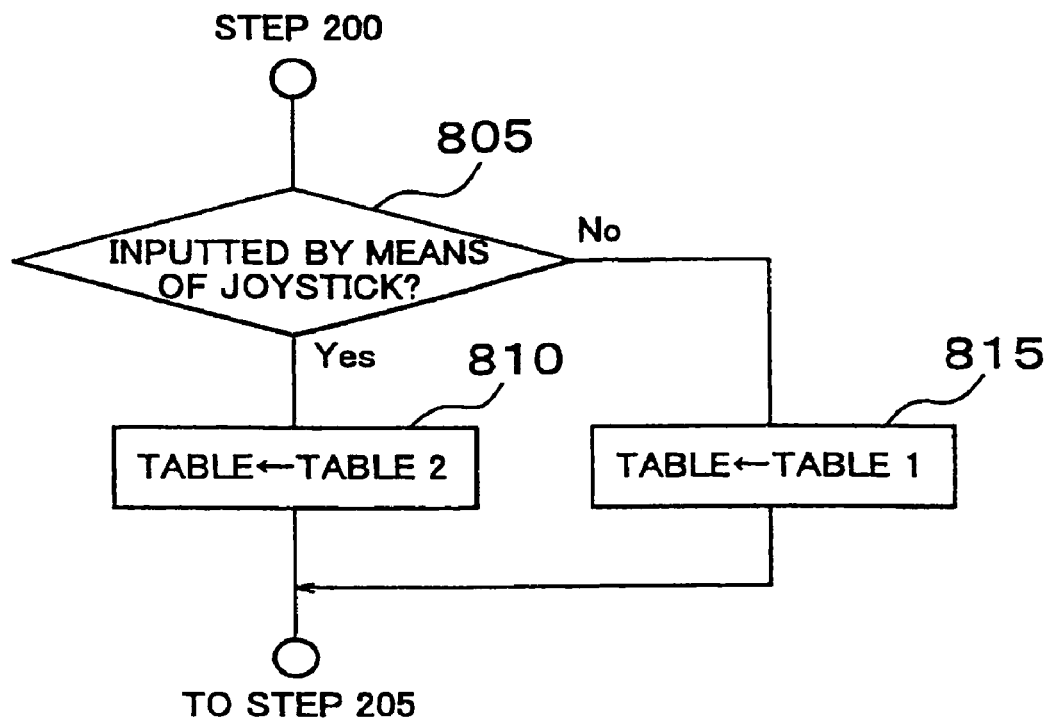
FIG. 8 is a flowchart showing part of a routine executed by a microcomputer shown in FIG. 7.
FIG. 9 is a table to which the microcomputer shown in FIG. 7 refers when calculating a screen-watching estimated time period.

In the second embodiment, a screen-watching estimated time period is estimated in accordance with a method of selectively operating a dummy switch. To be more specific, STEPS 805 through 815 shown in FIG. 8 are interposed among STEPS 200 through 205 of the routine shown in FIG. 2. That is, if the menu switch 21 is operated, the microcomputer 31 proceeds from STEP 200 to STEP 805 to judge whether the method of selectively operating a predetermined dummy switch is realized by the joystick 32a or by touching the screen of the display unit 10. The method of selective operation is set by means of an initializing screen (not shown).

If the method of selectively operating a dummy switch is realized by the joystick 32a, the microcomputer 31 proceeds to STEP 810 and replaces the table used in STEP 265 shown in FIG. 2 with a table shown in FIG. 9. If the method of selectively operating a dummy switch is not realized by the joystick 32a, the microcomputer 31 proceeds to STEP 815 to replace the table used in STEP 265 with the table shown in FIG. 5. The table shown in FIG. 9 is composed of preliminarily experimentally gathered data of a time period (a screen-watching estimated time period I) required for the operator to watch a screen until he or she selectively operates one of a plurality of dummy switches included in the screen, in connection with the number of dummy switches included in the screen. This table is stored in a memory (not shown) of the control unit 30. As is apparent from the foregoing description, the screen-watching estimated time period I for a screen including a certain number of dummy switches is longer in the table shown in FIG. 9 than in the table shown in FIG. 5.

Thereby, the microcomputer 31 reads out in STEP 265 a screen-watching estimated time period I corresponding to the method of selectively operating a dummy switch, calculates a sum Z of screen-watching estimated time periods I in STEP 270, and performs a nullification processing of the dummy switch in accordance with the summation time period Z by executing STEPS 275, 280. Accordingly, the summation time period Z can be calculated precisely irrespective of methods of selectively operating a dummy switch. Therefore, the driver can keep paying more careful attention to the driving.

As described above, according to the respective embodiments of the invention, selective operation of a dummy switch is appropriately regulated. The invention is not limited to the aforementioned embodiments, and various modification examples can be adopted within the scope of the invention. For example, in the routine shown in FIG. 2, the value of the timer T is set to "0" in STEP 215. However, it is also possible to employ a construction wherein the value of the timer T is set to its maximum in STEP 215, wherein a positive judgment is made in STEP 260 if the menu switch 21 is operated while the vehicle is traveling, and wherein the microcomputer proceeds to STEPS 265 and the following STEPS to regulate operation of a dummy switch based on the sum Z of screen-watching time periods I.

In the aforementioned embodiments, a screen completely different from the previously displayed screen (information) is displayed every time a dummy switch is selectively operated. However, the invention is also applicable, for example, to a case where when the operator inputs numbers constituting a phone number or the like one by one using dummy numeric keys that are constantly displayed on a screen, the inputted numbers are sequentially displayed within a predetermined frame of the screen on which the numeric keys are displayed.

What is claimed is:

1. A control apparatus for input screens that is installed in a vehicle and constructed to input predetermined operation performed by an operator based on information displayed by display device as an operator guidance and change information to be displayed by the display device upon input of the operator guidance, comprising:

operation nullification device that prohibits the predetermined operation performed by the operator from being inputted as the operator guidance upon fulfillment of a predetermined traveling condition related to operation of the vehicle to prevent unsafe operation while the vehicle is traveling; and operation nullification canceller that automatically cancels prohibition against the inputting of the predetermined operation performed by the operator as the operator guidance if a predetermined time period has elapsed since the prohibition against the inputting of the predetermined operation performed by the operator as the operator guidance.

2. The control apparatus according to claim 1, wherein:

the operation nullification device is constructed to judge whether or not the predetermined traveling condition has been fulfilled, depending on information displayed by the display device.

3. The control apparatus according to claim 1, further comprising:

first operation device for performing the predetermined operation based on a first action made by the operator; and second operation device for performing the predetermined operation based on a second action made by the operator, the second action being different from the first action, wherein:

the operation nullification device that judges whether or not the predetermined traveling condition has been fulfilled, depending on whether the predetermined operation is performed by the first operation device or by the second operation device.

4. A control apparatus for input screens that is installed in a vehicle and constructed to input predetermined operation performed by an operator based on information displayed by display device as an operator guidance and change information to be displayed by the display device upon input of the operator guidance, comprising:

operation nullification means for prohibiting the predetermined operation performed by the operator from being inputted as the operator guidance upon fulfillment of a predetermined traveling condition related to operation of the vehicle to prevent unsafe operation while the vehicle is traveling; and operation nullification cancel means for automatically canceling prohibition against the inputting of the predetermined operation performed by the operator as the operator guidance if a predetermined time period has elapsed since the prohibition against the inputting of the predetermined operation performed by the operator as the operator guidance.

5. A control method for input screens that is installed in a vehicle and constructed to input predetermined operation performed by an operator based on information displayed by display device as an operator guidance and change information to be displayed by the display device upon input of the operator guidance, comprising the steps of:

prohibiting the predetermined operation performed by the operator from being inputted as the operator guidance upon fulfillment of a predetermined traveling condition related to operation of the vehicle to prevent unsafe operation while the vehicle is traveling; and automatically canceling prohibition against the inputting of the predetermined operation performed by the operator as the operator guidance if a predetermined time period has elapsed since the prohibition against the inputting of the predetermined operation performed by the operator as the operator guidance.

* * * * *